United States Patent [19]
Brooks et al.
[11] 3,911,381
[45] Oct. 7, 1975

[54] TUNABLE ACOUSTIC WAVE PROPAGATION DEVICE

[75] Inventors: Robert E. Brooks, Manhattan Beach; Reynold S. Kagiwada, Los Angeles, both of Calif.

[73] Assignee: TRW Inc., Redondo Beach, Calif.

[22] Filed: Sept. 6, 1974

[21] Appl. No.: 503,900

[52] U.S. Cl. .................................. 333/72; 333/30 R
[51] Int. Cl.$^2$. H04R 17/10; H03H 9/26; H03H 9/32
[58] Field of Search ......... 333/30 R, 72; 310/8, 8.1, 310/8.2, 9.7, 9.8

[56] References Cited

UNITED STATES PATENTS

| | | | |
|---|---|---|---|
| 3,185,942 | 5/1965 | White | 333/30 R |
| 3,202,824 | 8/1965 | Yando | 333/30 R |
| 3,234,488 | 2/1966 | Fair | 333/30 R |
| 3,446,975 | 5/1969 | Adler et al. | 333/72 X |
| 3,516,027 | 6/1970 | Wasilik | 333/30 R |
| 3,836,876 | 9/1974 | Marshall et al. | 333/72 X |

OTHER PUBLICATIONS

Auld et al.–"Control of Acoustic Surface Waves with Photoconductive CdS Film" in Applied Physics Letters, Vol. 18, No. 8, April 15, 1971; pp. 339–341.

*Primary Examiner*—James W. Lawrence
*Assistant Examiner*—Marvin Nussbaum
*Attorney, Agent, or Firm*—Daniel T. Anderson, Esq.; Edwin A. Oser, Esq.; Jerry A. Dinardo

[57] ABSTRACT

A tunable acoustic wave proparation device such as a wave coupler or filter. A wave coupler, for example, conventionally includes a pair of acoustic transducers coupled to each other by a multistrip coupler consisting of parallel, evenly spaced metal strips to influence the propagation of an acoustic wave. These metal strips are replaced by light stripes generated by interferometric means. For example, two light beams may be generated which are projected at an angle upon a photoconductive layer upon which the conductive strips are generated. By changing either the angle of the two beams or the frequency of the light the spacing between adjacent light stripes can be varied. Their intensity can be varied by a mask which also influences the properties of the coupler.

8 Claims, 4 Drawing Figures

TUNABLE ACOUSTIC WAVE PROPAGATION DEVICE

BACKGROUND OF THE INVENTION

This invention relates generally to an acoustic wave propagation device and particularly relates to tunable devices of this type such as wave couplers or notched filters.

Acoustic wave couplers or filters are well known in the art. They consist of a piezoelectric slab upon which acoustic waves may be launched by an electrical transducer. The transducer is usually an interdigital transducer which changes an electric signal into an acoustic wave. Two spaced transducers may be coupled to each other by a multistrip coupler which simply consists of a plurality of evenly spaced, parallel metal strips.

Such devices may, for example, be used for coupling electric energy or directing it between two or more output transducers. They may also be used as filters to provide, for example, a stop band for the electric signal.

It would be highly desirable to be able to tune such a filter, thereby to change the characteristics of a coupler. For example, the amount of energy transferred to two or more transducers depends on the number of strips, the periodic spacing of the strips and the conductivity of the strips, as well as on the frequency of the acoustic wave. Thus the spacing between adjacent strips changes the notch frequency. The conductivity of the strips is, of course, inversely related to the resistivity. Hence the higher the conductivity the lower the insertion losses, that is minimum loss corresponds to zero resistivity. This loss is transformed into heat. The number of strips determines the amount of energy coupled to each one of two adjacent transducers.

In order to obtain control of acoustic surface waves a photoconductive film has been proposed in a paper by Auld et al. published in *Applied Physics Letters*, Volume 18, No. 8 of Apr. 15, 1971, pages 339 to 341. In this paper it is proposed to generate on a photoconductive film a pattern of light by means of a suitable optical mask. Such a mask may be a photoetch mask of the type used to produce the interdigital transducers. It will be evident that by changing such masks the properties of the filter or the like may be varied. However, continuous tuning is not possible.

An electronically tunable optical filter has been proposed in a patent to Hedrich et al. U.S. Pat. No. 3,822,929. Here an acoustic transducer propagates an acoustic wave on a piezoelectric material. The acoustic wave is now made to interact with an optical wave to produce a new optical wave having a different mode. The piezoelectric slab is covered by an optical waveguide which may, for example, consist of glass.

Acoustic wave multistrip couplers are known in the art. Such couplers are described in a paper by Marshall et al. which appears in IEEE Transactions on Sonics and Ultrasonics, Vol. SU-20, No. 2, Apr. 1973, pages 124–143. Acoustic wave resonators have also been proposed. Their operation has been discussed in a paper by Staples entitled "UHF Surface Acoustic Wave REsonators" which was presented at the 28th Annual Frequency Symposium in May 1974 and which will be published soon. The paper discusses reflector gratings which may be disposed adjacent either side of a transducer or between two spaced transducers, to provide a delay-line structure.

It is accordingly an object of the present invention to provide an acoustic wave propagation device which is continuously tunable over a certain range to control the properties of the resulting device.

A further object of the present invention is to provide an acoustic wave coupler or acoustic filter where the spacing between adjacent strips of the coupler may be continuously varied, as well as the number of strips and their intensity.

Another object of the present invention is to provide an acoustic wave propagation device of the type disclosed suitable as a continuously tunable filter of electric signals where the tuning of the filter can be easily and readily varied.

SUMMARY OF THE INVENTION

A tunable acoustic wave propagation device in accordance with the present invention may, for example, be a wave coupler, notch filter, delay line, resonator or the like. It includes a piezoelectric layer and a photoconductive layer disposed on the piezoelectric layer. Optical interferometric means are provided for projecting on the photoconductive layer a set of spaced light stripes to increase the conductivity of the photoconductive layer where each light stripe is projected. Finally, means are provided which are coupled to the optical interferometric means for varying the distance between adjacent light stripes. This may, for example, be effected by splitting the light from a substantially monochromatic light source into two light beams and for projecting the two light beams onto the photoconductive layer at an angle to generate thereon a system of light and dark fringes or light stripes. The spacing between the light stripes can be readily varied by either varying the angle between the two light beams or the frequency, that is the wavelength of the light.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENT

Figure 1:
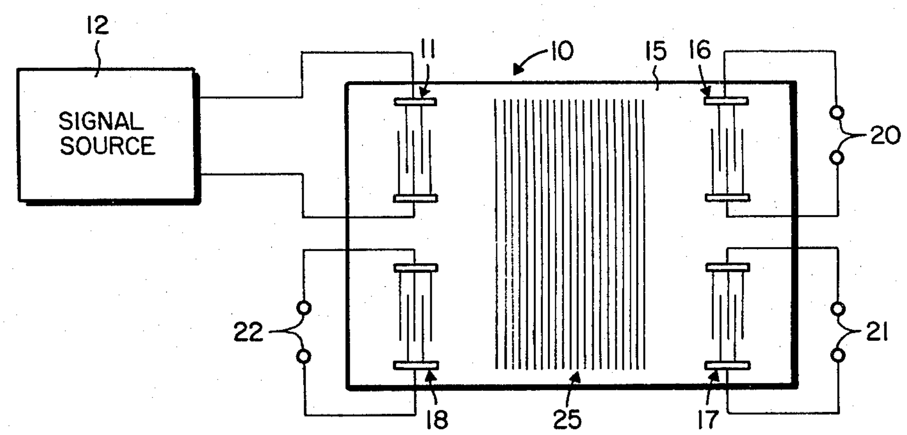
FIG. 1 is a top plan view of a tunable acoustic wave coupler embodying the present invention.
Figure 2:
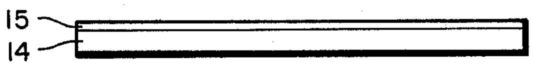
FIG. 2 is a side elevational view of the coupler of FIG. 1.

Referring now to the drawing and particularly to FIGS. 1 and 2, there is illustrated a conventional acoustic wave coupler 10. The coupler 10 includes an electro-acoustic transducer 11 which conventionally consists of an interdigital transducer. The transducer 11 is connected to an electrical signal source 12. The transducer 11 may be deposited on a structure consisting of a piezoelectric slab 14 having deposited thereon, for example, by coating or evaporating a photoconductive layer 15. The piezoelectric layer 14 may, for example, consist of lithium niobate ($LiNbO_3$); the photoconductive layer 15 may, for example, consist of cadmium sulphide (CdS) or cadmium zinc sulphide of the formula:

$$Cd_{1-x}Zn_xS$$

where $x$ is a fraction smaller than one.

When the electro-acoustic transducer 11 is excited by the electric signal from the source 12 it will generate an electric field which in turn induces in the piezoelectric slab 14 an acoustic surface wave. The coupler 10 shown by way of example in FIG. 1 is provided with additional transducers 16 and 17 which are laterally spaced from the transducer 11 and with a transducer 18 which may be disposed below the transducer 11. Each of the transducers 16 – 18 will change the acoustic surface wave into an electric signal which may be obtained respectively from output terminals 20, 21 and 22.

The transducers are coupled to each other by a multistrip coupler 25 which is of conventional construction. It consists of a plurality of conductive strips disposed parallel to each other and spaced from each other by predetermined equal distances. As explained before, the properties of the coupler are determined by the conductivity, the spacing between adjacent strips and by the number of strips. Depending on these parameters an acoustic signal launched from transducer 11 is received by transducer 16 or by transducer 17 or the energy may be split between the two transducers. The frequency response of the coupler 25 is rather broad. However, the frequency response exhibits a rather sharp and pronounced notch to provide a stop band. The frequency of the stop band is that frequency where the acoustic wavelength is twice the distance between adjacent strips of the coupler. Under this condition the acoustic wave is reflected by the coupler and hence would show up in the output transducer 18.

Figure 3:
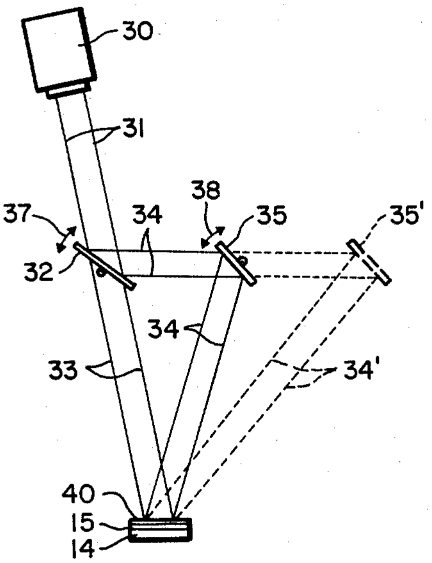
FIG. 3 schematically shows an optical arrangement for projecting two light beams onto the acoustic wave propagation device forming an angle with each other.

In accordance with the present invention the spacing between adjacent strips of the coupler 25 may be continuously varied. This may, for example, be effected by the apparatus shown in FIG. 3. The apparatus of FIG. 3 includes a quasi-monochromatic light source 30. This may consist of a laser as illustrated or any other light source which is sufficiently monochromatic to cause interference between two beams derived from the light source. Thus, a suitable gas discharge may provide a substantially monochromatic output such, for example, as a mercury lamp which preferably has a single mercury isotope.

The light source 30 generates an output beam 31 which may be split up by a beam splitter 32 into two beams 33 and 34. The beam 34 may be reflected by a mirror 35 so that the two beams 33 and 34 form a predetermined angle at the structure 10, that is on the photoconductive layer 15 which covers the piezoelectric slab 14.

Since the two light beams 33 and 34 interfere with each other at the surface of the photoconductive layer 14 they will form an interference pattern at that point. Therefore the two light beams will periodically reinforce and cancel each other. As a result a series of light stripes are formed on the photoconductive layer to change the conductivity of the layer where the light is projected. The result is that the equivalent of the coupler 25 is now produced on the photoconductive layer.

The distance between adjacent light stripes may readily be varied by varying the angle between the two light beams 33 and 34. This may, for example, be effected by rotating the beam splitter 32 and the mirror 35 about their first points as shown by arrows 37 and 38. This will, of course, vary the angle between the two beams. Alternatively, the mirror 35 may be laterally shifted in position as shown in dotted lines into the position 35' so that the new light beam 34' forms a larger angle at the photoconductive material 15.

Alternatively, instead of varying the angle between the two light beams it is also feasible to vary the frequency or wavelength of the light source 30. It is well known that certain lasers have an output frequency which can be readily changed or tuned over a wide range. By way of example, a dye laser may be tuned by simply changing the cavity resonance, that is the distance between the two cavity reflectors of the laser.

In this manner the spacing between adjacent light stripes of the coupler 25 may be continuously tuned or varied. It will also be understood that the invention may not only be applied to an acoustic wave coupler of the type illustrated in FIG. 1, but may as well be applied to an electric notch filter and other acoustic wave propagation devices.

It is also feasible to control the intensity of the light, for example, by applying a mask 40 directly over the photoconductive layer 15 as shown or elsewhere between the layer 15 and the two light beams 33 and 34. Such a mask may be provided by a suitable gray filter to control the intensity of the light and thereby the conductivity or resistivity of the strips formed by adjacent light stripes.

It is also feasible to utilize a mask such as the mask 40 for defining the area on the photoconducutive material 15 on which the light is projected. In other words such a mask may simply consist of a suitable rectangular aperture to pass the two light beams 33 and 34. This, of course, will control the number of stripes formed on the photoconductive layer 15.

It will therefore be evident that it is possible to control not only the spacing, but the conductivity and the number of stripes and thereby the characteristics of a coupler, filter or the like.

Figure 4:
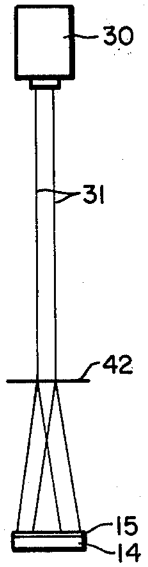
FIG. 4 is a schematic view of another optical arrangement for projecting a hologram image onto an acoustic wave coupler to generate thereon a system of light stripes.

The light stripes may also be formed in a different manner, that is by means of a hologram. This has been illustrated in FIG. 4 to which reference is now made. There is again provided a light source 30 which consists of a laser to generate a light beam 31. The light beam 31 is made to pass through a hologram 42 which has been recorded, for example, at the surface of the photoconductive layer 15 with the apparatus of FIG. 3. Therefore, the hologram 42 when illuminated by a laser beam 31 will reproduce again the pattern of light stripes which may then be projected on the photoconductive layer 15 disposed over the piezoelectric slab 14. By exchanging one hologram 42 for another it is feasible to obtain a multistrip structure with different spacing for different purposes.

There has thus been disclosed an acoustic wave propagation device having means for continuously varying or tuning the properties of a coupler, a filter or the like. The spacing between adjacent strips of the structure may be continuously varied by varying the angle of two coherent light beams as they are projected onto a photoconductive material. Alternatively, the spacing may be varied by varying the frequency or wavelength of the light. Both the intensity of the projected light and the number of light stripes may readily be controlled by a mask. Finally, the reconstructed light from a hologram may be utilized for obtaining the desired pattern of parallel adjacent and equally spaced light stripes. This will provide, for example, a continuously tunable electric filter which could not be provided before in such an easy and simple manner.

What is claimed is:

1. In a tunable acoustic wave propagation device:

a. a layer of piezoelectric material;

b. a layer of photoconductive material disposed on said piezoelectric layer;

c. a substantially monochromatic light source for generating a first light beam;

d. means for splitting said first light beam into a second and third light beam and for projecting them at a predetermined angle onto said photoconductive layer to generate thereon a series of spaced stripes to render said photoconductive layer conducting where a stripe is projected; and e. means for varying the angle between said second and third light beams, thereby to vary the spacing of said stripes.

2. In a device as claimed in claim 1 wherein a mask is interposed into the path of said second and third light beams for limiting the area of said photoconductive layer on which said stripes of light are projected and thereby the number of stripes.

3. In a device as defined in claim 1 wherein a mask is interposed between said second and third light beams and said photoconductive layer for controlling the intensity of said light stripes.

4. A tunable acoustic wave coupler comprising:

a. a layer of piezoelectric material;

b. a layer of photoconductive material disposed on said piezoelectric layer;

c. a pair of interdigital acoustic transducers provided on said photoconductive layer and spaced from each other;

d. a source of substantially monochromatic light for generating a first light beam;

e. means for splitting said first light beam into a second and third light beam and for causing said second and third light beams to intersect at said photoconductive layer at a predetermined angle to each other and between said transducers; and f. means for varying at will the angle between said second and third light beams, thereby to vary the spacing between the light stripes projected on said photoconductive material.

5. A coupler as defined in claim 4 wherein additional interdigital acoustic transducers are disposed on said photoconductive layer and in cooperative relationship with said light stripes.

6. A coupler as defined in claim 4 wherein a mask is interposed between said photoconductive material and said second and third light beams for limiting the area of said light stripes and thereby their number.

7. A coupler as defined in claim 4 wherein a mask is interposed between said photoconductive layer and said second and third light beams for controlling the intensity of said light stripes.

8. In a tunable acoustic wave propagation device:

a. a piezoelectric layer;

b. a photoconductive layer disposed on said piezoelectric layer;

c. a laser for generating a first light beam;

d. means for splitting said first light beam into a second and a third light beam and for projecting them onto said photoconductive layer at a predetermined, fixed angle; and e. means for varying the frequency of the light beam developed by said laser, thereby to vary the distance between adjacent light stripes projected on said photoconductive material.

* * * * *